(12) United States Patent
Emmrich

(10) Patent No.: US 9,494,105 B2
(45) Date of Patent: Nov. 15, 2016

(54) PISTON

(71) Applicant: Mahle International GmbH, Stuttgart (DE)

(72) Inventor: Dieter Emmrich, Waiblingen (DE)

(73) Assignee: Mahle International GmbH (DE)

( * ) Notice: Subject to any disclaimer, the term of this patent is extended or adjusted under 35 U.S.C. 154(b) by 45 days.

(21) Appl. No.: 14/373,346

(22) PCT Filed: Jan. 9, 2013

(86) PCT No.: PCT/EP2013/050266
§ 371 (c)(1),
(2) Date: Jul. 18, 2014

(87) PCT Pub. No.: WO2013/107672
PCT Pub. Date: Jul. 25, 2013

(65) Prior Publication Data
US 2014/0352649 A1 Dec. 4, 2014

(30) Foreign Application Priority Data
Jan. 19, 2012 (DE) .................. 10 2012 200 749

(51) Int. Cl.
- *F16J 1/16* (2006.01)
- *F02F 3/00* (2006.01)
- *B23B 41/04* (2006.01)

(52) U.S. Cl.
CPC ............ *F02F 3/0015* (2013.01); *B23B 41/04* (2013.01); *F16J 1/16* (2013.01); *B23B 2215/245* (2013.01); *F02F 2200/00* (2013.01); *Y10T 29/49249* (2015.01)

(58) Field of Classification Search
CPC ........ F02F 3/00; F02F 3/0069; F02F 3/0015; F02F 2200/00; F16J 1/16; B23B 41/04; B23B 2215/245; Y10T 29/49249
USPC ......................................... 123/193.6; 92/187
See application file for complete search history.

(56) References Cited

U.S. PATENT DOCUMENTS

| 2,990,226 A | 6/1961 | Fangman |
| 3,745,889 A * | 7/1973 | Hill et al. ................ 92/187 |
| 7,246,552 B2 | 7/2007 | Schroeder |

(Continued)

FOREIGN PATENT DOCUMENTS

| DE | 1526570 A1 | 1/1970 |
| DE | 1650206 A1 | 8/1970 |

(Continued)

OTHER PUBLICATIONS

German Search Report for DE102012200749.0, dated Aug. 1, 2013.

(Continued)

*Primary Examiner* — Marguerite McMahon
(74) *Attorney, Agent, or Firm* — Fishman Stewart PLLC

(57) ABSTRACT

A piston for an internal combustion engine may include a plurality of pin bores for accommodating a piston pin. The pin bores may be transversely oval to a longitudinal axis of the piston. The pin bores may be formed in a circular cylindrical manner at a zenith of $\alpha=0°$ and at a nadir of $\alpha=180°$. The pin bores may be formed in an oval manner with an oil-holding volume at an equator of $\alpha=90°$ and $\alpha=270°$. The pin bores may include a transition between the equator and the zenith and between the equator and the nadir that runs in a continuous and differentiable manner.

20 Claims, 2 Drawing Sheets

(56) References Cited

U.S. PATENT DOCUMENTS

| | | | |
|---|---|---|---|
| 8,863,719 B2* | 10/2014 | Boekle et al. | 123/193.6 |
| 2006/0101939 A1* | 5/2006 | McEwan | 74/579 R |
| 2006/0219066 A1 | 10/2006 | Nicholl | |
| 2007/0095200 A1 | 5/2007 | Schroeder | |
| 2009/0165743 A1* | 7/2009 | Kemnitz et al. | 123/193.6 |
| 2010/0300396 A1* | 12/2010 | Issler | 123/197.1 |

FOREIGN PATENT DOCUMENTS

| | | |
|---|---|---|
| DE | 2152462 A1 | 4/1973 |
| DE | 3609019 C1 | 9/1987 |
| DE | 4141279 A1 | 6/1993 |
| DE | 102006050859 A1 | 5/2007 |
| GB | 1405959 A | 9/1975 |
| JP | 10-103514 | 4/1998 |
| JP | 2003161203 A | 6/2003 |
| JP | 2007263058 | 10/2007 |

OTHER PUBLICATIONS

PCT Search Report for PCT/EP2013/050266, dated Jan. 9, 2013.
English abstract for JP-10103514.
English abstract for JP-2003161203.
English abstract for DE-3609019.
English abstract for JP-2007263058.

* cited by examiner

PISTON

CROSS-REFERENCE TO RELATED APPLICATIONS

This application claims priority to International Patent Application PCT/EP2013/050266 filed Jan. 9, 2013, and German Patent Application No. 10 2012 200 749.0 filed Jan. 19, 2012, the contents of which are hereby incorporated by reference in their entirety.

TECHNICAL FIELD

The present invention relates to a piston for an internal combustion engine having pin bores for accommodating a piston pin. The invention also relates to a method for producing such a piston.

BACKGROUND

DE 1 650 206 A discloses a generic piston for an internal combustion engine having pin bores for accommodating a piston pin, the pin bores being formed in a transversely oval manner to the longitudinal axis of the piston for load optimisation. The transversely oval formation of the pin bores is intended in particular to ensure reliable oil supply during operation of the internal combustion engine. The transversely oval pin bore should also have a noise-damping effect and be able to absorb the different thermal expansions of the piston and of the pin.

U.S. Pat. No. 2,990,226 also discloses a generic piston having a transversely oval pin bore.

DE 36 09 019 C1 discloses a method for producing a pin bore of a trunk piston, in which pocket-like recesses are formed in the pin bores, starting from the piston interior, to avoid boss cracks. With pistons in which the connecting rod is guided through the boss of the piston in the direction of the crankshaft longitudinal axis, lubricating oil is introduced into the said pockets from the connecting rod small end. In order to be able to guide the latter to the radially outer end of the pin bore with the least possible reduction in the pin bore area, even with pockets formed in the pin bore, a groove that leads radially outwards and acts as an oil channel is formed on the pockets during cutting with the aid of a change in the position of a milling tool cutting the pockets. However, a second work step is needed to form the said groove.

US 2007/0095200 A1 likewise discloses a generic piston having a transversely oval pin bore, the pockets mentioned in the said document likewise having to be produced in a separate work step.

SUMMARY

The present invention is concerned with the problem of specifying an improved or at least an alternative embodiment for a piston of the generic type, which has a high load capacity and improved lubricating behaviour owing to efficient production.

This problem is solved according to the invention by the subject matter of the independent claims. Advantageous embodiments form the subject matter of the dependent claims.

The present invention is based on the general concept of configuring the pin bores provided in a piston known per se for an internal combustion engine for accommodating a piston pin in a transversely oval manner and in a circular cylindrical manner at $\alpha=0°$, i.e. at the zenith, and at $\alpha=180°$, i.e. at the nadir, and in an oval manner at a approx. 90° and 270° (equator) with an oil holding volume, wherein a transition between the equator and the zenith, and between the equator and the nadir, runs in a continuous and differentiable manner, i.e. without edges. The specific embodiment of the pin bores allows the contact faces between the piston and the pin to lie virtually parallel opposite each other at the zenith (and nadir), as a result of which the areal contact between the pin and the piston can be adjusted directly to transmit the gas pressure load without additional bending of the piston around the pin, which would lead to increased loading on the piston. This is achieved in that the pin bores are approximately circular cylindrical at least in the region of the zenith without edges being formed in the transition region between the zenith and the equator, such as is the case in the prior art (US 2007/0095200 A1, DE 36 09 019 A1, U.S. Pat. No. 2,990,226 A). The transversely oval pin bore according to the invention is thus a corrected transversely oval pin bore, which is for example linearly oval or double-oval. Such a pin bore according to the invention can be produced by means of a lathe, in which either the piston to be drilled or the turning tool is deflected on each revolution during the actual drilling or turning process. Furthermore, it is of particular advantage in this production method that the corrected transversely oval pin bore can be produced in a single work step and thus the oil-holding pockets do not have to be turned or milled in a separate, second work step, as was previously customary. The transversely oval configuration means that considerably improved lubrication of the pin can be achieved than would be the case for example with purely cylindrical pin bores. An oil-holding volume that does not have any edges and does not load the piston head as much as a classical transverse ovality can be created in the boss bore by the solution according to the invention.

In an advantageous development of the solution according to the invention, the pin bores have a radial deviation from the circular shape of $r_d<2$ μm at $340°<\alpha<20°$ and at $130°<\alpha<230°$. A virtually circular cylindrical shape and therefore an areal contact between the piston and the pin is thus ensured both in the zenith region and in the nadir region without additional piston bending in order to close the increasing contact gap owing to the ovality. Additional loading owing to the piston bending around the pin of the both thermally and mechanically highly loaded piston head is produced thereby. (This is the typical disadvantage of conventional transversely oval boss bores.)

The pin bores expediently have a radial deviation from the circular shape of $10<r_d<40$ μm at $\alpha$ approx. 90° and $\alpha$ approx. 270°, i.e. in the equator region. It can be seen clearly here that the diameter of the pin bore is much greater in the region of the equator and therefore clearly deviates from the diameter at the nadir and zenith, it being possible for the oil-holding pockets or oil-holding volumes necessary for the lubrication to be created by the radial deviation. Such oil-holding volumes are necessary in particular for sufficient lubrication and thus also low-noise operation of the piston.

In a further advantageous embodiment of the solution according to the invention, the pin bore also has a vertical ovality in addition to the transverse ovality. The maximum surface pressures in the bore are thereby shifted e.g. into the +15° and −15° regions. The resulting forces on the piston can again reduce piston bending and further relieve the load on the piston head. A force input point can in particular also be shifted out of the zenith and nadir into adjacent regions owing to such a vertical ovality.

In a further advantageous embodiment of the solution according to the invention, the pin bores are additionally formed with symmetrical or asymmetrical trumpets. These trumpet shapes fundamentally have the purpose of avoiding edge pressures and other increases in pressure that arise inter alia under loading from the pin bending and ovalisation. An asymmetrical formation in particular allows a different formation of the nadir and zenith sides. This has the advantage that the widened portions of the trumpets can be adapted to the different loads owing to gas and mass forces and where necessary an asymmetrical boss for a trapezoidal or stepped connecting rod can be taken into account.

The invention is further based on the general concept of producing the specially transversely oval pin bores according to the invention by carrying out a simultaneous oscillation of the piston or of the drill superposed on the drilling. Owing to the piston or drill oscillating during the drilling, in particular the oil-holding volume in the equator region can be produced together with the drilling or turning of the pin bore, so that the latter does not have to be produced in a separate and thereby complex second work step, as previously customary. Alternatively, such a shape can also be produced in one work step by means of a magnetically mounted drilling spindle. A prerequisite for this is also the continuous and differentiable shape of the pin bore. The piston according to the invention can thereby be produced efficiently in manufacturing terms and thereby in a comparatively cost-effective manner still with extremely high quality.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
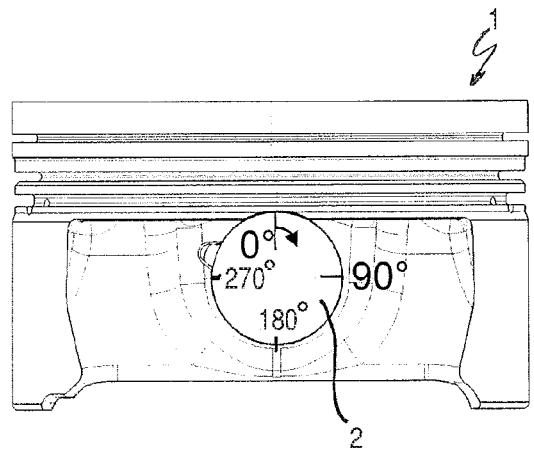
FIG. 1 schematically shows a view of a piston according to the invention.

According to FIG. 1, a piston 1 according to the invention for an internal combustion engine (not shown) has a pin bore 2 for accommodating a piston pin (likewise not shown), the pin bore 2 being formed in a transversely oval manner to the longitudinal axis, i.e. in the present case to the vertical axis, of the piston 1. According to the invention, the pin bore 2 is then circular cylindrical at $\alpha=0°$, i.e. the zenith, and at $\alpha=180°$, i.e. the nadir, whereas it is oval with an oil-holding volume, for example in the manner of oil-holding pockets, at $\alpha=90°$ and $270°$, i.e. in the equator region. A transition between the equator and the zenith and between the equator and the nadir is then continuous and differentiable, that is, the said transition runs without edges. Owing to the circular cylindrical shape of the pin bore 2, in particular in the zenith region and in the nadir region, it has a comparatively large area by means of which it is in contact with the piston pin in a force-transmitting, virtually parallel manner. Therefore, the pin bore 2 preferably has an essentially cylindrical shape at $345°<\alpha<45°$ and at $135°<\alpha<225°$. This provides the great advantage compared to transversely oval pin bores previously known from the prior art that the piston bending that otherwise occurs with oval boss bores to close the enlarged contact gap can be avoided.

The pin bore 2 can generally be formed for example in a linearly oval or double-oval manner. Although only one pin bore 2 is mentioned below, it is of course clear that there are usually two pin bores 2 arranged flush with each other per piston 1.

Figure 2:
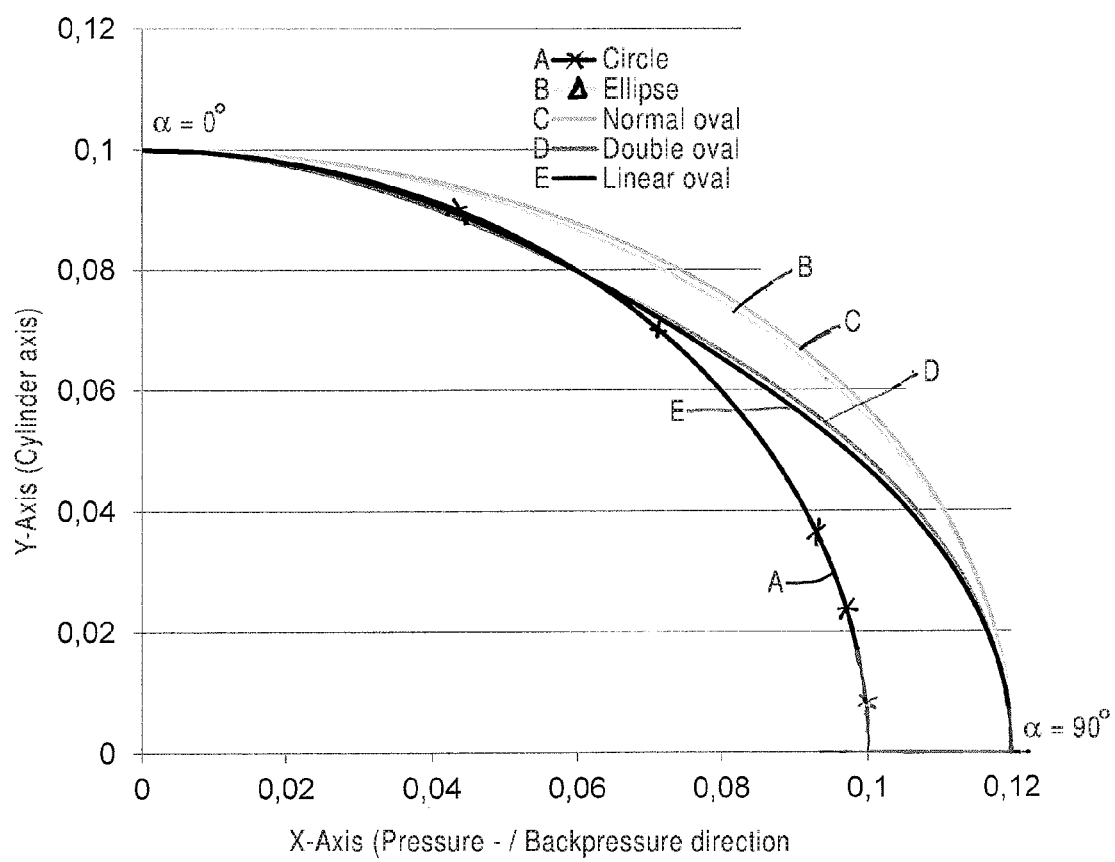
FIG. 2 schematically shows a diagram to illustrate the specially transversely oval pin bore according to the invention; shown exaggerated for illustration purposes, FIG. 3 schematically shows a diagram to illustrate radial deviations for different transversely oval pin bores, FIG. 4 schematically shows a diagram as in FIG. 2, but with a vertically oval pin bore in addition.

If FIG. 2 is viewed, a detail of the pin bore 2 between $\alpha=0°$ and $\alpha=90°$ can be seen, the specially transversely oval pin bore 2 according to the invention in this case being described with the lines D (double oval) and E (linearly oval). It is noticeable that both the double oval and the linearly oval characteristic curves D, E are identical to the circular bore A between $\alpha=0$ and $\alpha$ approximately $45°$, from which the comparatively constant gap width in the contact region between the piston and the pin results. The lines D and E are thus approximate to the circular curve A in the region between $\alpha=0$ and $\alpha$ approx. $45°$.

Figure 3:
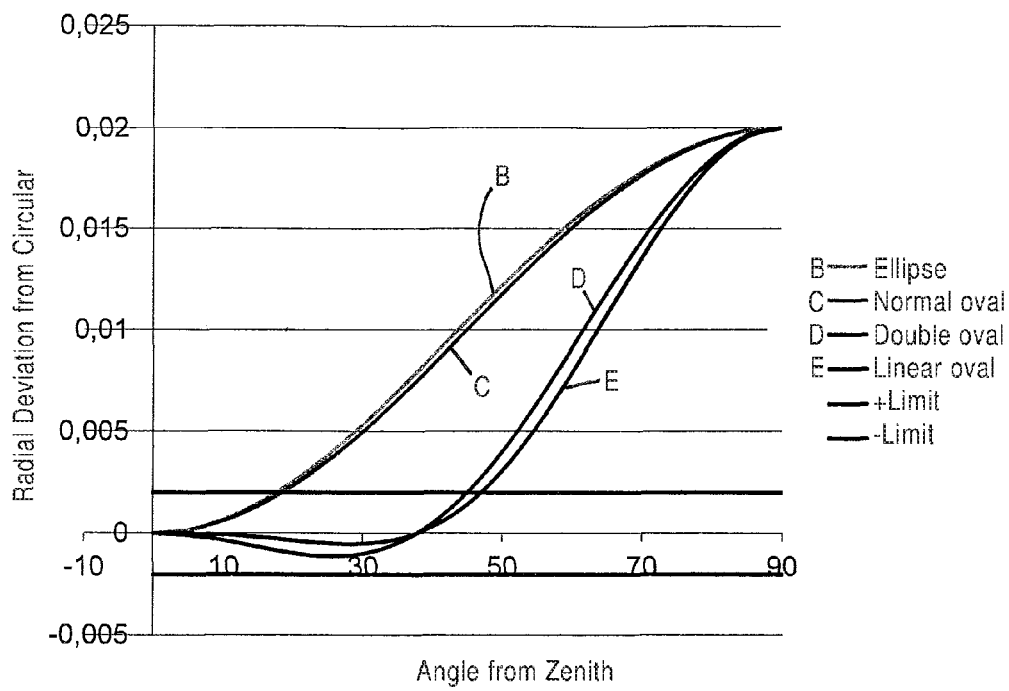
Figure 4:
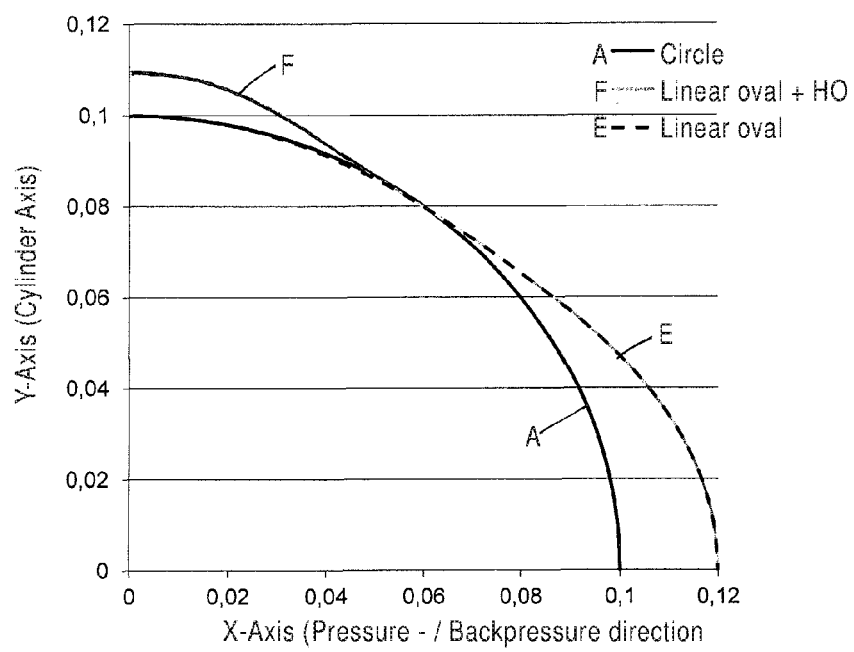

However, between $\alpha=45°$ and $\alpha=90°$ the characteristic curve D, E according to the invention of the pin bore 2 according to the invention deviates clearly from the circular shape, so that at $\alpha=90°$ there is already a radial deviation $r_d$ of approx. 20 μm. This is also clearly shown in FIG. 3, in which the radial deviation $r_d$ from the circular shape is shown in millimeters. In a range of $340°<\alpha<20°$ and $130°<\alpha<230°$, a radial deviation $r_d$ from the circular shape is less than 2 μm, whereas in the equator region, that is, in the region at $\alpha$ approximately $90°$ or $270°$, it is greater than 10 μm and up to 40 μm. It is self-evident in this case that both a symmetrical and an asymmetrical inner and/or outer shaped bore (trumpet) can be superposed on the pin bore 2. If FIG. 3 is viewed again, it can be seen that with the pin bore 2 produced according to the invention, i.e. with the characteristic curves D and E for double oval and linearly oval respectively, a radial deviation $r_d$ of more than 2 μm does not set in until after an angle $\alpha$ of approx. $45°$, whereas with an ellipse B and a normal oval C the deviation sets in as early as $20°$ and thereby causes increased piston bending. Of course, the diagrams shown in FIGS. 2 to 4 are shown exaggerated for illustration purposes.

In order to be able to describe the specially transversely oval pin bore 2 in an arithmetical manner and in order to obtain a shape similar to a circle in the regions around the zenith and the nadir, a correction is superposed on the mathematical description, e.g. for a double oval the ovality of the pin bore 2 is defined for example as follows:

$$h_K\alpha = 0.5H^*(1-\cos(2\alpha)) + k\alpha \text{ where } k\alpha = 0.5^*Kt^*(1-\cos(4\alpha))$$

where:

H is the signed radial ovality nominal value [mm],
h$\alpha$ is the (radial) ovality at angle $\alpha$ [mm],
h$_K\alpha$ is the corrected (radial) ovality at angle $\alpha$ [mm],
$\alpha$ is the angle,
Kt is the correction value.

The first summand corresponds to classical transverse ovality.
Alternatively to this, the ovality of the pin bore 2 can also be defined as follows:

$$h_K\alpha = 0.5*H(1-\cos(2\alpha))+k\alpha \text{ where } k\alpha=0.5*Kt*(1-\cos(4\alpha))*|\sin\alpha|$$

where:
H is the signed radial ovality nominal value [mm],
hα is the (radial) ovality at angle α [mm],
$h_K\alpha$ is the corrected (radial) ovality at angle α [mm],
α is the angle,
Kt is the correction value.

This shape is advantageous for certain manufacturing methods and is called linear correction. If FIG. 4 is viewed, it can be seen that, in addition to the pure ovality, the pin bore 2 can also have a vertical ovality HO, which is described according to characteristic curve F.

With the pin bore 2 according to the invention, it is possible to support the piston better and thereby greatly increase the load capacity owing to the virtually constant gap width in the zenith region and in the nadir region, that is at α approx. 0° and 180°. Owing to the transverse ovality, oil volumes can be created in the region of α=90° and α=270° that effect better lubrication. The idea is to form the transverse ovality in such a manner that it behaves like a cylindrical boss bore at 0° and 180° (=good for the piston head), but still keeps the oil-holding volume of the transverse ovality at 90 and 270° to make the boss stronger by means of better lubrication than with a cylindrical shaped bore. An advantage compared to slots and the like is that no additional work step is needed for this volume and furthermore no edges are produced in the boss bore. Such a shaped bore can for example be achieved by corresponding selection of the parameters of the above-mentioned mathematical descriptions or similar. The continuous transition from the zenith to the equator and from the equator to the nadir means that in particular edges known from the prior art are omitted, as a result of which a comparatively quiet and smooth operation of the piston is possible. The pin bore 2 according to the invention can be produced by a simultaneous oscillation of the piston 1 or drill being superposed on the drilling, so that the specially transversely oval pin bore 2 according to the invention can be produced in a single work step and thus in a simple and cost-effective manner in manufacturing terms. In particular, subsequent milling or turning of the oil-holding volumes in the piston boss is no longer necessary. With the specially transversely oval pin bore 2 according to the invention, more lightweight piston pins can also be used owing to the reduced load, as a result of which the oscillating mass and thus the energy consumption for operating the internal combustion engine can be reduced.

In concrete terms, the following values can be selected for the production of a pin bore 2 according to the invention having a diameter of D=2 cm for values of H (radial ovality characteristic value) and Kt (correction value):

|    | normal oval | linear oval | double oval | vertical oval |
|----|-------------|-------------|-------------|---------------|
| H  | 20 μm       | 20 μm       | 20 μm       | 20 μm         |
| Kt | 0 μm        | −8 μm       | −8 μm       | −8 μm to +10 μm in range from −90° to 270° |

The invention claimed is:

1. A piston for an internal combustion engine, comprising: a plurality of pin bores for accommodating a piston pin, wherein the pin bores are transversely oval to a longitudinal axis of the piston, the pin bores formed in a circular cylindrical manner at a zenith of α=0° and at a nadir of α=180° and in an oval manner with an oil-holding volume at an equator of α=90° and α=270°, wherein a transition between the equator and the zenith and between the equator and the nadir runs in a continuous and differentiable manner;
wherein the pin bores at least along an arc between α=0° and α=180° have a circular shape at 0°≤α<45° and 130°<α≤180°, and the pin bores deviate from the circular shape at 45°<α≤130°; and
wherein at least one of the plurality of pin bores has a shape defining a double ovality at 45°<α≤130°.

2. The piston according to claim 1, wherein the pin bores have a circular shape at 345°<α<45° and at 135°<α<225°.

3. The piston according to claim 1, wherein at least one other of the plurality of pin bores has a shape defining a linear ovality.

4. The piston according to claim 1 wherein the double ovality is represented as follows, $$h_K\alpha=0.5H*(1-\cos(2\alpha))+k\alpha \text{ where } k\alpha=0.5*Kt*(1-\cos(4\alpha))$$

wherein:
H is a signed radial ovality nominal value in mm,
hα is a radial ovality at angle α in mm,
$h_K\alpha$ is a corrected radial ovality at angle α in mm,
α is the angle, and
Kt is a correction value.

5. The piston according to claim 3, wherein the linear ovality is represented as follows, $$h_K\alpha=0.5*H(1-\cos(2\alpha))+k\alpha \text{ where } k\alpha=0.5*Kt*(1-\cos(4\alpha))*|\sin\alpha|$$

wherein:
H is a signed radial ovality nominal value in mm,
hα is a radial ovality at angle α in mm,
$h_K\alpha$ is a corrected radial ovality at angle α in mm,
α is the angle,
Kt is a correction value.

6. The piston according to claim 1, wherein the pin bores at 340°<α<20° and 130<α<230° have a radial deviation from the circular shape of $r_d$<2 μm.

7. The piston according to claim 1, wherein the pin bores at α~90° and α~270° have a radial deviation from the circular shape of 10<$r_d$<50 μm.

8. The piston according to claim 1, wherein the pin bores have at least one of a symmetrical shape and an asymmetrical shape.

9. The piston according to claim 6, wherein the pin bores at α~90° and α~270° have a radial deviation from the circular shape of 10<$r_d$<50 μm.

10. The piston according to claim 1, wherein the double ovality is configured as a negative superposition having a local diameter less than that of a normal ovality.

11. The piston according to claim 3, wherein the linear ovality is configured as a negative superposition having a local diameter less than that of a normal ovality.

12. A method for producing a piston, comprising: drilling pin bores in a transversely oval manner to a longitudinal axis of the piston via a simultaneous oscillation superposed on the drilling of at least one of the piston and a drill;
forming the pin bores in a circular cylindrical manner at a zenith of α=0° and at a nadir of α=180°; and
forming the pin bores in an oval manner with an oil-holding volume at an equator of α=90° and α=270°;

wherein a transition between the equator and the zenith and between the equator and the nadir runs in a continuous and differentiable manner;

wherein forming the pin bores in the circular cylindrical manner further includes forming the pin bores to define a circular shape at 340°<α<45° and at 130°<α<230°; and wherein forming the pin bores in the oval manner further includes forming the pin bores to define a radial deviation from the circular shape greater than a threshold at 45°<α<130° and at 230°<α<340'; and wherein the radial deviation of at least one of the pin bores has a shape defining a double ovality.

13. The method according to claim 12, wherein drilling the pin bores in the transversely oval manner includes magnetically mounting a drilling spindle to deflect radially synchronously with a rotation of the piston.

14. The method according to claim 12, wherein the radial deviation of at least one other of the pin bores has a shape defining a linear ovality.

15. The method according to claim 12, wherein the double ovality is represented as follows, $$h_K\alpha = 0.5H^*(1-\cos(2\alpha))+k\alpha \text{ where } k\alpha=0.5^*Kt^*(1-\cos(4\alpha))$$

wherein:
H is a signed radial ovality nominal value in mm,
hα is a radial ovality at angle α in mm,
$h_K\alpha$ is a corrected radial ovality at angle α in mm,
α is the angle, and
Kt is a correction value.

16. The method according to claim 14, wherein the linear ovality is represented as follows, $$h_K\alpha=0.5^*H(1-\cos(2\alpha))+k\alpha \text{ where } k\alpha=0.5^*Kt^*(1-\cos(4\alpha))^*|\sin\alpha|$$

wherein:
H is a signed radial ovality nominal value in mm,
hα is a radial ovality at angle α in mm,
$h_K\alpha$ is a corrected radial ovality at angle α in mm,
α is the angle, and
Kt is a correction value.

17. A piston for an internal combustion engine, comprising:
a plurality of pin bores for accommodating a piston pin, the pin bores being transversely oval to a longitudinal axis of the piston;
the pin bores having a zenith and a nadir along the longitudinal axis, and the pin bores having an equator transverse to the longitudinal axis, wherein the pin bores are formed in a circular cylindrical manner in a region of the zenith and in a region of the nadir, and in an oval manner with an oil-holding volume at the equator, the equator having a radial deviation from a circular shape of greater than 2 μm;

wherein the pin bores include a transition between the equator and the zenith and between the equator and the nadir running in a continuous and differentiable manner;

wherein the pin bores deviate from the circular shape after an angle of 45° from at least one of the zenith and the nadir, and wherein the radial deviation of the equator extends along an arc of less than 90° on at least one side of the longitudinal axis; and wherein the radial deviation of at least one of the pin bores has a shape defining a double ovality.

18. The piston according to claim 17, wherein at least one bore includes a vertical ovality along the longitudinal axis in addition to being transversely oval, the at least one bore having the circular shape in the region of the zenith and the region of the nadir between the vertical ovality and the radial deviation of the equator.

19. The piston according to claim 17, wherein the double ovality is represented as follows, $$h_K\alpha=0.5H^*(1-\cos(2\alpha))+k\alpha \text{ where } k\alpha=0.5^*Kt^*(1-\cos(4\alpha))$$

wherein:
H is a signed radial ovality nominal value in mm,
hα is a radial ovality at angle α in mm,
$h_K\alpha$ is a corrected radial ovality at angle α in mm,
α is the angle, and
Kt is a correction value.

20. The piston according to claim 17, wherein the radial deviation of at least one other of the pin bores has a shape defining a linear ovality, and wherein the linear ovality is represented as follows, $$h_K\alpha=0.5^*H(1-\cos(2\alpha))+k\alpha \text{ where } k\alpha=0.5^*Kt^*(1-\cos(4\alpha))^*|\sin\alpha|$$

wherein:
H is a signed radial ovality nominal value in mm,
hα is a radial ovality at angle α in mm,
$h_K\alpha$ is a corrected radial ovality at angle α in mm,
α is the angle, and
Kt is a correction value.

* * * * *